Figure 1:
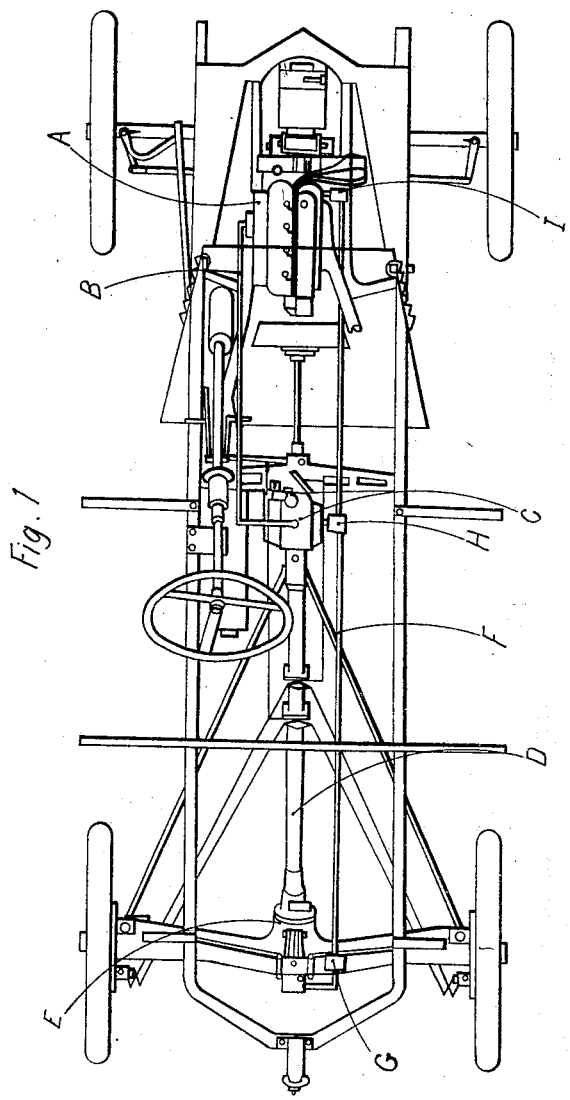

March 14, 1933.  L. SAIVES  1,901,379
SYSTEM FOR THE CENTRAL LUBRICATION OF VEHICLES
Filed Feb. 29, 1928  2 Sheets-Sheet 1

INVENTOR.
LEON SAIVES,
By O'Neill & Bunn
ATTORNEYS.

March 14, 1933.  L. SAIVES  1,901,379
SYSTEM FOR THE CENTRAL LUBRICATION OF VEHICLES
Filed Feb. 29, 1928   2 Sheets-Sheet 2
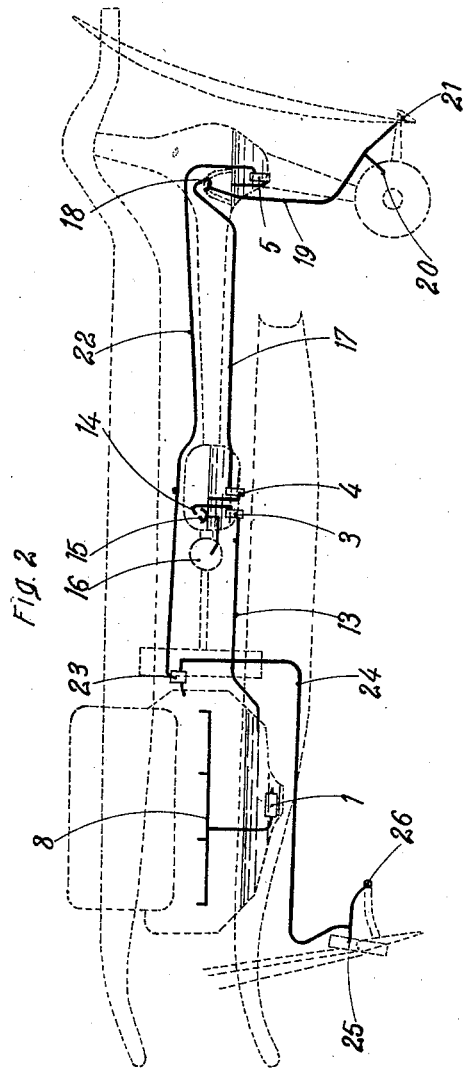
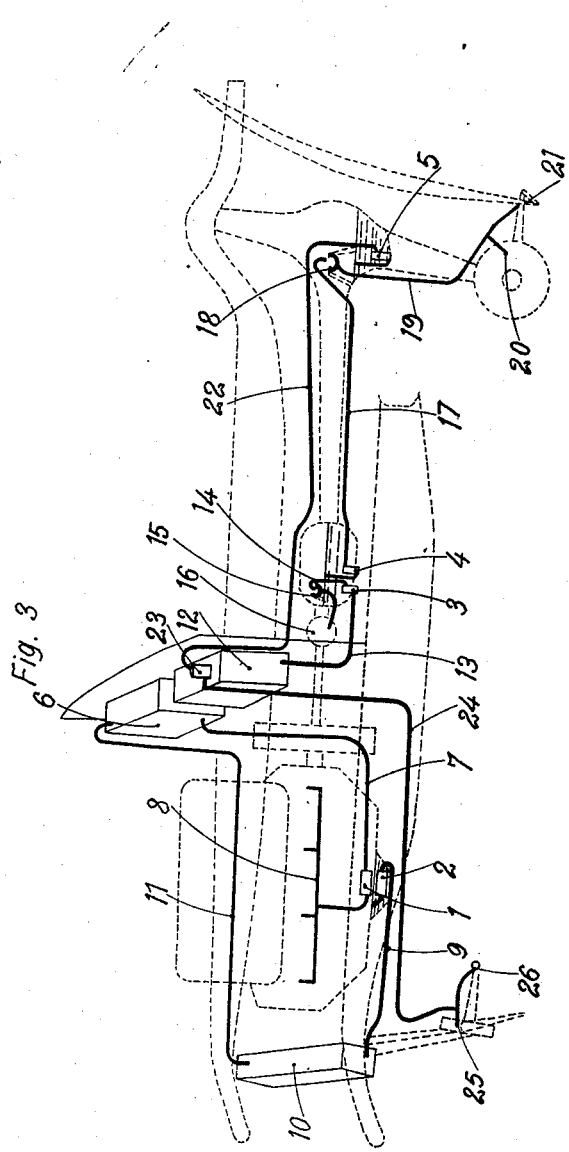
INVENTOR
LÉON SAIVES.
By O'Neill & Bunn
ATTORNEYS.

UNITED STATES PATENT OFFICE

LÉON SAIVES, OF BILLANCOURT, FRANCE, ASSIGNOR TO LOUIS RENAULT, OF BILLANCOURT, FRANCE

SYSTEM FOR THE CENTRAL LUBRICATION OF VEHICLES

Application filed February 29, 1928, Serial No. 258,033, and in France April 23, 1927.

My present invention relates to improvements in systems providing for the central lubrication of vehicle frames which are adapted for use upon all vehicles in general, and chiefly upon motor vehicles, such as motor trucks, tractors, and other vehicles.

The invention has for its main object improvements in lubricating systems of the kind whereby the oiling of the vehicle is realized by means of wicks, and consists in supplying the said wicks by the splashing of oil due to the motion of the parts in the interior of the corresponding casings.

It has already been proposed to employ devices for central oiling by the use of wicks, in which the oil, which is placed in a tank mounted under the hood, is supplied to the different points of the vehicle frame by means of wicks placed in the main and branch pipes. In such known devices, the oil travels along the wicks in a constant manner, during the operative and the inoperative periods of the engine.

In one of the improvements according to my invention the oil is supplied to the wicks only when the vehicle is in operation, thus offering a considerable economy of oil during the inoperative periods of the vehicle.

The casings which serve for the oil supply to the wicks may be the engine casing itself, the casing containing the change-speed box, or the casing of the rear axle.

It will be observed that during the motion of the several parts of the vehicle, there will be produced in the said casings a certain splashing of oil which will act in the usual manner to moisten the fibres at the end of the wicks, and thus the oil may travel along such wicks to the several points to be lubricated.

By way of example, I may employ a device comprising wicks placed in the different casings, and in this manner the wicks placed in the engine casing are connected by suitable piping with the front vehicle axle, with the joints of the shock absorbers, with the axles of the spring shackles, and the like. The wicks which are connected with the gearing of the change-speed box supply the oil to the thrust ball joint, to the rod and link gear of the change-speed device, to the rod and link gear of the hand or pedal brakes, or the like. Also, the wicks situated in the casing of the rear axle will lubricate the differential, the joints of the brake levers, and axles of the springs and the axles for the control of the expanding members of the brakes, and like parts.

It will be easy to make various arrangements as concerns the disposition of the wicks, without departing from the scope of the invention.

The main pipes and the branch pipes may be arranged in any suitable manner, and may obviously comprise a sufficient stiffening to protect the device against accidental crushing or shocks.

The system of lubrication above described may be employed as a central oiling system, thus offering an automatic lubrication of all parts of the vehicle, and all the auxiliary parts will be lubricated from the main parts by means of wicks or like capillary devices for the supply of oil to the parts to be lubricated.

Moreover, in a vehicle, the points to be lubricated are in relative movement, i. e. the vehicle frame on the one hand and the front and rear axles on the other hand, and another object of my invention consists in eliminating or reducing the number of flexible pipes or conduits connecting the several parts of the vehicle.

The essential feature of my improved system consists in using the engine, which forms the central part of the lubricating system, for the periodic supply of a large amount of oil to the change-speed box for its lubrication. The excess of oil proceeds into the power transmission gear and circulates thence into the rear axle, whereby the latter is abundantly lubricated. A suitable device such as a pump—or more simply one of the elements already in use, with level gear control—serves to bring the excess of oil to the central lubricating point, which is the engine in this case. From the oil return conduit thus employed, in the case of capillary lubrication, is taken the first supply of oil necessary for the lubrication of the secondary parts of the vehicle.

In the case in which the oiling is effected by means of the usual pipes, two methods may be employed.

In the first method, I provide upon the return piping suitable relay recipients in which are immersed the wicks which supply the oil in drops to the lubricating conduits.

In the second case, a small piston pump is provided in each of the main elements such as change-speed box or rear axle, for the supply of the oiling conduits, and the excess of oil returns to the central recipient, this being the engine crankcase.

The pump which is mounted in the crankcase to produce the lubricating impulsion by supplying the oil to the principal parts of the vehicle, has its speed reduced in such manner that its piston acts only after a certain time of operating or after a certain distance of travel.

It will be observed that by this arrangement, all of the principal and the secondary parts will be lubricated in an entirely automatic manner.

It is simply necessary to provide a sufficient amount of oil in the crankcase. This oil is periodically supplied to the principal parts of the vehicle, i. e. the change-speed box and the rear axle, and it then returns to the main recipient through pipes which supply the offtakes of the capillary system, or auxiliary recipients for the lubrication of the secondary parts.

The said systems or recipients are mounted on the return piping at points near the three principal elements, the rear axle, change-speed box and engine, and they serve for the oiling of the adjacent parts; this will afford three lubricating points, situated respectively at the front, the center and the rear.

The offtakes for the oiling of the secondary parts are placed upon the return piping, in such manner that the oiling will cease when the vehicle is stopped, since the return circulation pump, which is mounted on the rear axle, stops at the same time.

Obviously, I may employ any suitable pump, either of the piston type with or without clack valves, or of the diaphragm type, or the like.

The said invention will be more particularly described with reference to the appended drawings.

Fig. 1 shows by way of example an embodiment of the invention. Fig. 2 is a modification, relating to a single circulation of oil in the various parts of the vehicle frame. Fig. 3 is a view analogous to Fig. 2, relative to the case in which the circulation of oil for the engine is distinct from the circulation for the other parts.

Referring to Fig. 1, it will be observed that the oil is sent by a pump—submerged in the crankcase A—into a conduit B leading into the casing C of the change-speed box. The excess of oil from said box proceeds through the tube D secured to the rear axle E, into the said axle; the excess of oil in the rear axle is supplied by a pump or a suitable element of the rear axle to a pipe F for the return of the oil to the engine crankcase. Upon the pipe F are provided the starting boxes G—H—I for the oiling of the auxiliary parts. In the form of construction which is given by way of example, the said lubricating boxes are three in number, and are situated adjacent the respective principal parts i. e. the rear axle, change-speed box and engine.

In the arrangement shown in Fig. 2, it is observed that the oil in circulation is supplied from the engine. In this diagrammatic view which is given by way of example, the main oil tank is contained in the lower casing of the engine. The engine is supposed to be lubricated without pressure by means of the pump 1 and the supply pipes 8.

The oil is circulated in the other parts in the following manner:

A pump 3, driven from the change-speed box, withdraws oil from the engine through the pipe 13 and delivers it into the transmission casing through the pipe 14. One or more small troughs 15 are placed below the stream to collect a certain part of the oil and to supply the local points. This distribution is effected by tubes containing wicks or like capillary devices, optionally interposing local chambers forming recipients. In the present view, the ball joint 16 of the change-speed box is supplied by the trough 15.

A second pump 4, placed in the change-speed box, is actuated in a like manner; it withdraws the excess of oil from said box and sends it into the rear axle through the pipe 17. In this element, other troughs are provided. For instance the trough 18 sends oil through the pipe 19 to the shaft of the brake cam disposed at 20, and to the spring shackles, placed at 21. The excess of oil from the rear axle is taken up by a pump 5 driven by said axle and is sent through the pipe 22 to the engine; before returning to the engine, said pipe 22 traverses a chamber 23 which serves the same purpose as the said troughs of the box and the rear axle. In this manner, the pipe 24 leading from the chamber 23 supplies a spindle axle 25 and a ball joint 26 of a connecting bar; the parts for brake control and like parts requiring a regular oiling are supplied in the same manner.

The said lubricating arrangement offers the following advantages:

1.—The lubrication is entirely automatic.

Only a single chamber needs be filled, this being the engine crankcase. All the parts of the vehicle frame are lubricated without attention, and the oil level in such parts is automatically regulated by the circulation.

2.—The functions are separated. In this manner the oiling of the engine is distinct from the oiling of the parts of the vehicle, since the engine pump is driven by the engine itself and the other pumps are driven by the power transmission gear. If the engine is running when the vehicle is stopped, the oil is not supplied to the transmission gear, but if the vehicle is traveling on a downward slope with the engine stopped, all the parts will be oiled except the engine.

Fig. 3 shows a modified construction in which the oiling of the engine is made distinct from the oiling of the combination consisting of the vehicle frame and the power transmission gear. For this purpose I employ a separate oil tank for this combination; said tank 12 is mounted on the dashboard, and it receives the feed pipe 13 of the pump 3 which withdraws the oil therefrom for delivery to the transmission. The oil returns from the rear axle through the pipe 22 in all cases into a chamber 23 placed above the tank 12 and whose overflow descends into said tank. As before, the said chamber 23 supplies the joints of the front part of the vehicle frame.

The engine can be lubricated according to a known system. I prefer to use a separate tank 6 which supplies the pressure feed pump 1. A second pump 2, whose output exceeds that of the preceding, empties the lower casing and sends the oil through the radiator 10 by means of the pipe 9. The oil then rises to the tank through the pipe 11. It is preferable to mount on this return pipe, in series or branch, one or more suitable purifying devices.

This system of double-circuit lubrication offers the following advantages.

1.—The oiling is quite automatic. There are two chambers to be filled. All the parts are oiled, and it is not necessary to verify the level of oil in the change-speed box, the axle or the engine.

2.—The amount of oil on hand can be observed when running, and for this purpose each tank can be fitted with a level indicator visible from the seat.

3.—The oil circulation can be observed. For the engine, a gauge serves to show the pressure in the oil pipes 8. For the two circuits, the return of the oil to the tanks may take place in glass tubes or the like which can be observed from the driver's seat.

4.—The several functions are separated, as in the one-circuit system.

5.—Proper safety is obtained. Should one of the circuits be stopped, the other circuit will continue to operate. In particular, the breakage of a pipe on the circuit including the frame and transmission gear will be without effect on the circuit of the engine, so that the engine will not be subject to gripping.

6.—Two different oils may be employed for the engine and for the power transmission gear.

7.—The consumption of lubricating oil is considerably reduced. The engine requires to be emptied more frequently than the other parts. Due to the separation between the circuits, the amount of oil to be thus removed will be reduced.

I may also employ a combination lubricating system as above described, but provided with a single circuit, in which the tanks 6 and 12 are united in one, so that the oil is used in common. In this manner the supply is simplified, but there is less safety and economy than with the double-circuit system.

I claim:

1. A lubricating installation for motor vehicles, including a main reservoir and auxiliary reservoirs, pumps driven by the moving parts of the vehicle for delivering the lubricants in a circuit from the main reservoir to the several auxiliary reservoirs and return, receiving troughs arranged in each auxiliary reservoir for retaining a portion of the delivered lubricants, and wicks leading from said trough to parts of the vehicle requiring lubrication.

2. A lubricating installation for motor vehicles including a main reservoir and auxiliary reservoirs formed by the transmission and differential casings, troughs arranged in the casings, a pump for forcing oil from the main reservoir to the trough in the transmission casing, and from the transmission casing to the trough in the differential casing, wicks leading from said troughs to adjacent parts requiring lubrication, a return pipe connecting the differential reservoir and the main reservoir, a receiving trough in said line, and means distributing lubricant from said trough to adjacent parts.

In testimony whereof I affix my signature.

LÉON SAIVES.